Oct. 22, 1946.  F. L. FULKE  2,409,978
MINING MACHINE CHAIN
Filed June 7, 1943
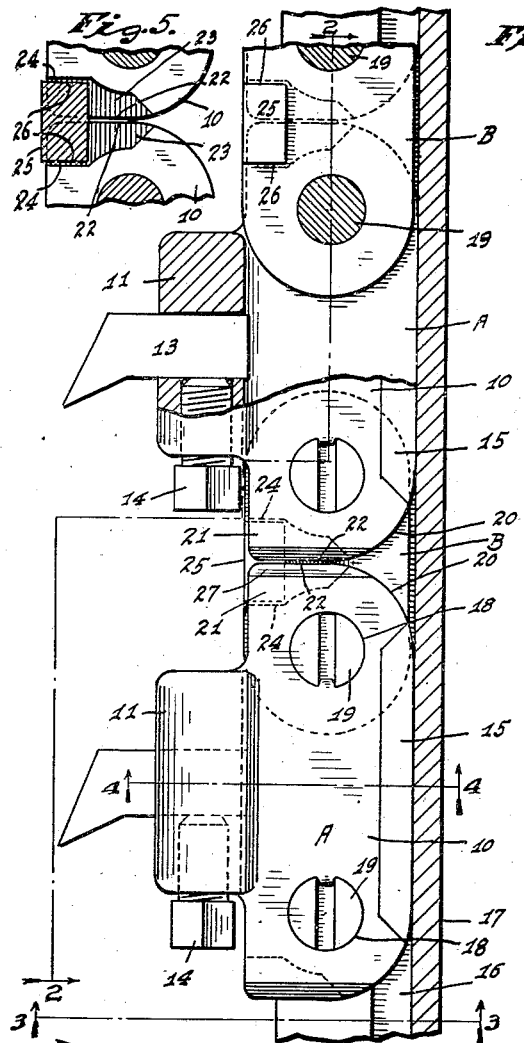
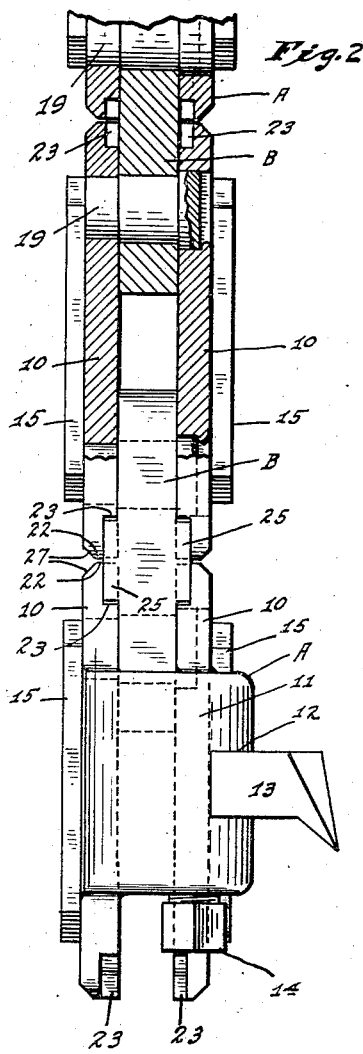
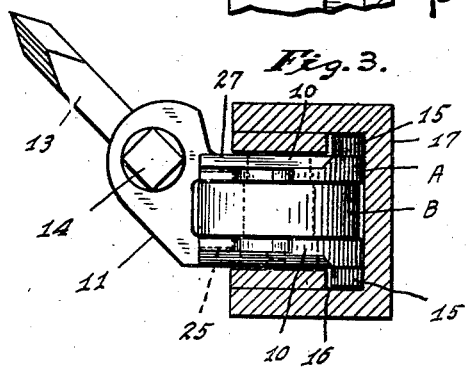
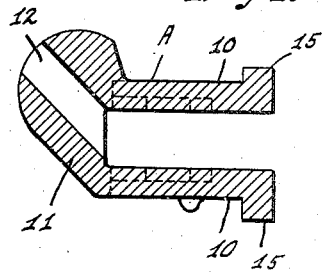
INVENTOR.
FRANK L. FULKE,
BY Hood & Hahn
ATTORNEYS.

Patented Oct. 22, 1946

2,409,978

UNITED STATES PATENT OFFICE 2,409,978

MINING MACHINE CHAIN

Frank L. Fulke, Terre Haute, Ind., assignor to Frank Prox Company, Inc., Terre Haute, Ind., a corporation of Indiana Application June 7, 1943, Serial No. 489,938

8 Claims. (Cl. 74—250)

The object of this invention is to provide an improved cutter chain for mining machines wherein adjacent links are so formed as to sturdily resist reverse bending under coal-cutting loads and to guard against entry of hard particles of undue size.

The accompanying drawing illustrates an embodiment of my invention:

Fig. 1 is a plan, in partial horizontal section, of a portion of my improved chain, and an associate guide of usual form;

Fig. 2 a section on line 2—2 of Fig. 1;

Fig. 3 a section on line 3—3 of Fig. 1;

Fig. 4 a section on line 4—4 of Fig. 1; and

Fig. 5 a fragmentary section in a plane at right angles to the plane of Fig. 2 and at the ends of adjacent bit-carrying links.

My improved chain is composed of a plurality of alternate bit-carrying links A and connecting links B.

Each link A is a unitary structure comprising spaced side plates 10, 10 and connecting bridge 11 perforated at 12 to receive a cutter bit 13 which is held in place by a set screw 14. The outer faces of plates 10, at their inner edges, carry guide ribs 15 each adapted to fit and slide in a runway 16 of the usual guide channel 17.

The plates 10, near each end, are perforated, at 18, to receive pivot-pins 19 and the ends of these plates, at their inner edges are rounded, at 20, to provide proper flexibility to pass around the supporting sprocket wheels, but are substantially square at their outer corners 21 to provide surfaces 22 capable of engaging similar surfaces of adjacent links to prevent undesirable reverse flexing of the chain inwardly. In the inner face of each portion 21 of each plate 10 I provide a pocket 23 forming a stop shoulder 24 below which the pocket is so formed as to permit proper flexing of the chain around its supporting sprocket wheels, as clearly shown in Fig. 5.

Links B lie between plates 10 of links A and are perforated near their ends to receive pivot pins 19. On the opposite faces of link B at their middles and adjacent its outer edge I provide integral lugs 25 each capable of lying within a pair of pockets 23 of adjacent links A and each having end faces 26, 26 closely adjacent shoulders 24 of links A thereby limiting inwardly flexing of the chain. These lugs 25 substantially fill the outer ends of the pockets 23. The outer faces of parts 21 of plates 10, adjacent surfaces 22 are chamfered, as shown at 27.

Chains of this type operate in a substantially horizontal plane overlaid by a coal body into which a cut is being made and a prime consideration in cutter chain design is to keep the bit point as near the main body of the bit-carrying links as possible, for even at best there is a very powerful back-rocking or reverse bending tendency due to the cutting load applied at the bit point. It is not possible to reduce this leverage beyond certain limits because of several factors. There must be 1½" to 2" between bit point and bridge 11 or coring and abrasion of bridge 11 may occur when the bits fail to remove all coal and hard impurities as fast as the feed of the machine advances the cutting. Then bridge 11 must be of sufficient height and size to permit associating the bit with it. Then bridge 11 must be carried outwardly beyond the outer edges of plates 10 and outwardly of the guide 17. So that when all these distances are added up it is seen that the bit point will be not much less than 6" beyond the base or inner edge of the link A. But the pivot centers of the link on its two journal pins 19 are only 3½" apart, so that a powerful rocking leverage is present, and consequently some means must be sought to help hold the bit point firmly against the working load by preventing the link from reverse bending, that is, preventing it from rocking on its rear pivot. Various means to do this have been applied such as in my Patent No. 1,650,566, issued November 22, 1927, in Stenger Patent No. 2,039,747, issued May 5, 1936, and in Levin Patent No. 2,068,808, January 26, 1937.

The mechanisms shown in my Patent No. 1,650,566 and Stenger Patent No. 2,039,747 are open to the very serious objection of hard fragments of rock or extremely hard impurities of substantial size getting caught between the interlocking surfaces as a nut in a nutcracker.

The mechanism shown in Levin Patent No. 2,068,808 is particularly open to the objection of hard fragments of rock getting caught under the closing jaws of the interlock surfaces. It is also objectionable in that the interlocking jaws of the bit link require extra height above the upper edge of the connecting link, thus forcing the bit point farther away from the link base. The Levin jaws would prohibit using preferred types of socket wrenches on his set screw and force the use of open end wrenches unless he raises his screw, thereby raising his link head and consequently his bit point. Unless he did this he would be forced to reduce the height of his connecting link which would thin its cross section of metal above the journal hole which is the natural breaking point of any link. In my new interlocking mechanism I have contrived to remove all the above objections to the three types mentioned.

It will now be seen that surfaces 24 and 26 will promptly engage to prevent any bending of the connected links in a direction reverse to that of bending around the sprocket. It will also be seen that the thickness of metal above journal hole 18 has not been reduced and set screw 14 has not required raising but lies close to the outer edges of plates 10. It will also be apparent that hard fragments larger than granular size cannot get caught between the abutment surfaces 24 and 26 as they close because they are substantially shielded in my construction by overlying portions 21 of plates 10 even when surfaces 24 and 26 separate as the chain bends around its sprocket.

The ends 22 of plates 10 also abut to prevent reverse bend and in my construction I eliminate any possibility of hard fragments being caught between the abutting surfaces by making these surfaces narrow by chamfering at 27, so that fragments larger than granular size will be deflected outward from contacting surfaces 22 by the surfaces 27. Note also the scissor action of this interlock as compared with the nutcracker action in Stenger No. 2,039,747. I am able to make contacting surfaces 22 narrow without danger of them being mashed and distorted because of the effective aid given by abuttable surfaces 24 and 26, in other words, I am able to provide a multiple combination of adjacent surfaces at each joint, four pairs of adjacent surfaces internally of and shielded by the overlapping portions of links A, and two pairs of scissor-type by direct abutment of the bit links themselves, and I consider this combination to be extremely effective toward bracing the connected links to rigidly resist not only working loads on the bit tending to reverse bend the chain, but also the severe lateral pressures developed at the chain joints in the cutting operation.

I claim as my invention:

1. In a cutter chain, a bit link having spaced side plates connected centrally at their upper edges by an integral bit-supporting bridge, said side plates at each end beyond said bridge being perforated with aligned journal pin openings, and a connecting link fitting between said side plates and swiveling upon journal pins mounted in said journal pin openings of two adjacent bit links, said side plates at each opposite end beyond said head being formed at the outer portion of their inside faces with recesses defining abutment surfaces and said connecting links being formed centrally of the outer portions of their sides with projecting shoulders defining abutment surfaces cooperating with said first-mentioned abutment surfaces, to prevent reverse bend of any of said links.

2. In a cutter chain, a bit link comprising a pair of spaced plates perforated at their ends by pin openings, and a connecting link sized to fit between said pairs of spaced plates and perforated at each end by pin openings, and a pivot pin connecting said links, one of said plates of each bit link having at each end a recess formed in its inner face to define an abutment surface transverse of the link, and each connecting link having at its middle two transverse abutment surfaces lying in the recesses of adjacent bit links facing the abutment surfaces thereof to limit reverse bend of said chain.

3. In a cutter chain, a bit link formed with a pair of laterally spaced plates each perforated to hold an end of a cross pin, and a connecting link fitted between said spaced plates, perforated at each end to receive such cross pin, and formed to provide a transversely-projecting abutment means intermediate its ends, one plate of each bit link being formed with an inward recess in its inner face between the extreme end of said plate and the axis of said journal pin, said recess providing an abutment surface in close proximity to, and adapted to contact with, a surface on said connecting link abutment means to limit reverse swing of the links.

4. A cutter chain bit link, comprising laterally spaced plates transversely perforated at each end, there being at each end of said link, in the inner face of a side plate, a recess defining an abutment surface transverse of said inner face, lying in a plane substantially perpendicular to the direction of movement of the chain, and extending from the outer edge of said link to a point short of a projection of the line joining the centers of the perforations in said link, and adapted to engage a cooperative abutment surface of a connecting link, said recess further defining a wall merging with said abutment surface and substantially concentric with the adjacent perforation, and intersecting said projection of said line.

5. A cutter chain, comprising alternating bit links and connecting links, means pivotally connecting each of said connecting links with adjacent ends of two bit links, each of said bit links being formed to provide at least one abutment surface lying transverse to the line of movement of the chain, and each of said connecting links being formed to provide an abutment surface disposed to coact with such abutment surface of each of its associated bit links to limit relative pivotal movement of said links in one direction, and said links further being formed to provide masking means overlying said coacting abutment surfaces.

6. A cutter chain comprising two bit links, each of said links being formed at its opposite ends to provide two spaced, parallel, perforated arms, said pairs of arms being connected by an intermediate, bit-carrying bridge, each of said arms terminating in a surface lying substantially perpendicular to a line joining the centers of said perforations, a connecting link received between the arm pairs at adjacent ends of said two links and formed with perforations registering with the perforations in said arms, means engaging in said registering perforations and pivotally connecting said bit links to said connecting link with said first-named surfaces of the adjacent arm pairs of said two bit links in close juxtaposition, at least one arm of each of said connected arm pairs being formed with a recess in its inner surface providing an abutment surface substantially parallel with said first-named surface, and abutment means carried by said connecting link and operatively associated with said last-mentioned abutment surfaces, and overlaid and protected by said link arms.

7. A cutter chain comprising two bit links, each of said links being formed at its opposite ends to provide two spaced, parallel, perforated arms, said pairs of arms being connected by an intermediate, bit-carrying bridge, each of said arms terminating in a surface lying substantially perpendicular to a line joining the centers of said perforations and extending from the outer edge of said bit to merge with a surface substantially concentric with the adjacent perforation, a connecting link received between the arm pairs at adjacent ends of said two links and formed with perforations registering with the perforations in said arms, means engaging in said registering perforations and pivotally connecting said bit links to said connecting link with said first-named surfaces of the adjacent arm pairs of said two bit links in close juxtaposition, at least one arm of each of said connected arm pairs being formed with a recess in its inner surface providing an abutment surface substantially parallel with said first-named surface, and abutment means carried by said connecting link and operatively associated with said last-mentioned abutment surfaces, and overlaid and protected by said link arms.

8. A cutter chain comprising two bit links, each of said links being formed at its opposite ends to provide two spaced, parallel, perforated arms, said pairs of arms being connected by an intermediate, bit-carrying bridge, the terminal portion of each of said arms being reduced in thickness and presenting a narrow surface substantially perpendicular to the line of movement of the chain, a connecting link received between the arm pairs at adjacent ends of said two links and formed with perforations registering with the perforations in said arms, means engaging in said registering perforations and pivotally connecting said bit links to said connecting link with said first-named surfaces of the adjacent arm pairs of said two bit links in close juxtaposition, at least one arm of each of said connected arm pairs being formed with a recess in its inner surface providing an abutment surface substantially parallel with said first-named surface, and abutment means carried by said connecting link and operatively associated with said last-mentioned abutment surfaces, and overlaid and protected by said link arms.

FRANK L. FULKE.